United States Patent

LaVanway et al.

[11] Patent Number: 5,301,464
[45] Date of Patent: Apr. 12, 1994

[54] VARIABLE LENGTH LIMB-SPREADER

[76] Inventors: M. Lee LaVanway, Box 737, Flint Hill, Va. 22627; Edward Dorstewitz, 611 Lake St., St. Joseph, Mich. 49085

[21] Appl. No.: 839,189

[22] Filed: Feb. 20, 1992

[51] Int. Cl.⁵ .............................................. A01G 17/10
[52] U.S. Cl. ............................................. 47/43; 47/4; 248/351
[58] Field of Search ................... 47/42, 43, 4; 248/351

[56] References Cited

U.S. PATENT DOCUMENTS

| 661,891 | 11/1900 | Parker | 47/43 |
|---|---|---|---|
| 4,377,053 | 3/1983 | Roark et al. | |
| 4,501,561 | 2/1985 | Speelman | 47/351 |
| 4,649,665 | 3/1787 | McBride | |
| 4,918,860 | 4/1990 | Breadner | |

FOREIGN PATENT DOCUMENTS

| 355672 | 3/1921 | Fed. Rep. of Germany | 47/42 |
|---|---|---|---|
| 119491 | 8/1947 | Sweden | 47/42 |
| 601973 | 9/1975 | Switzerland | 47/42 |
| 1158104 | 5/1985 | U.S.S.R. | 47/42 |

Primary Examiner—Henry E. Raduazo

[57] ABSTRACT

Horticulture, particularly limb spreaders. Applicant's variable length limb-spreader may be interposed between the tree central leader and the outwardly extending limbs at a variety of lengths, for example, 3", 6", 9", 12", 15", 18" and 22". Applicant's molded plastic device includes an elongate shaft having pairs of divergent tree-engaging arms at each end and a plurality of outwardly extending limb-engaging struts extending from the top and bottom of the shaft. Tree-engaging spikes may be molded so as to extend between the pairs of arms, as well as between the struts and the top and bottom of the elongate shaft.

9 Claims, 2 Drawing Sheets

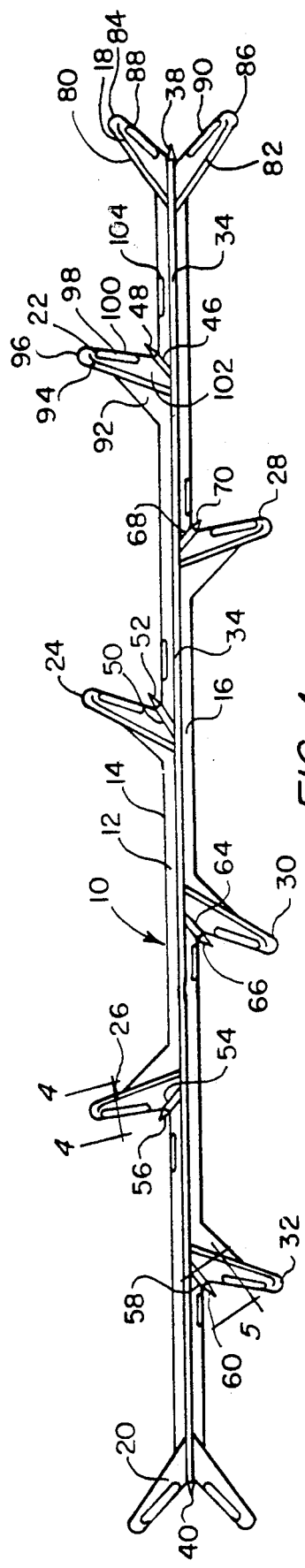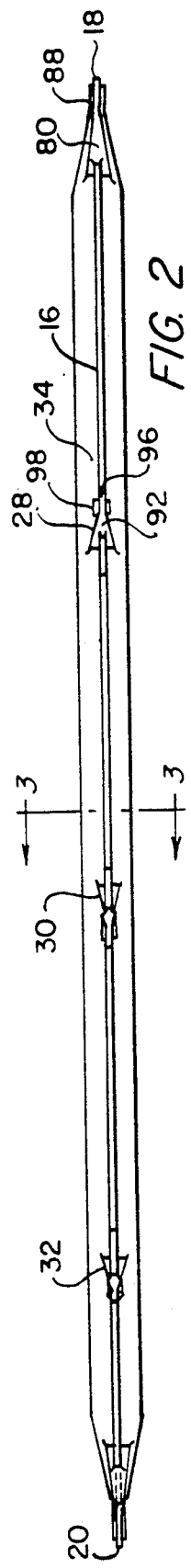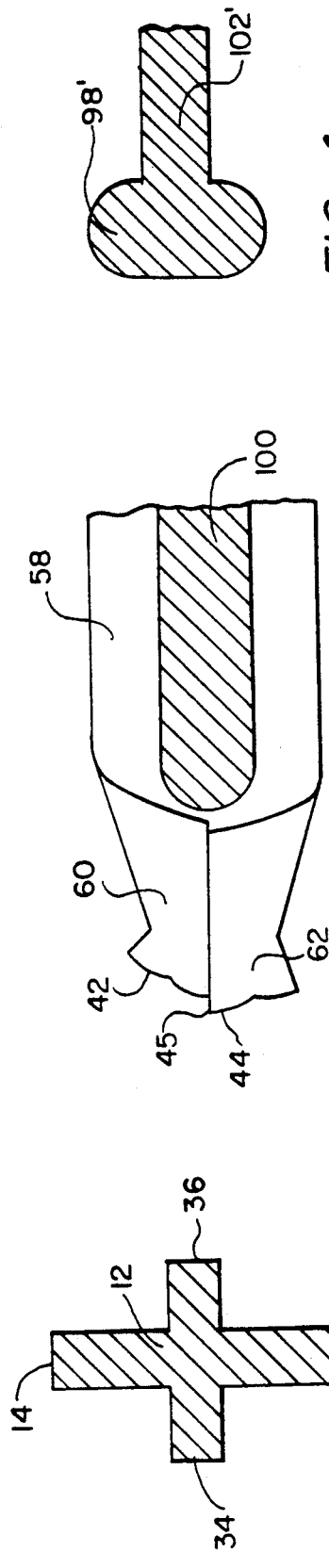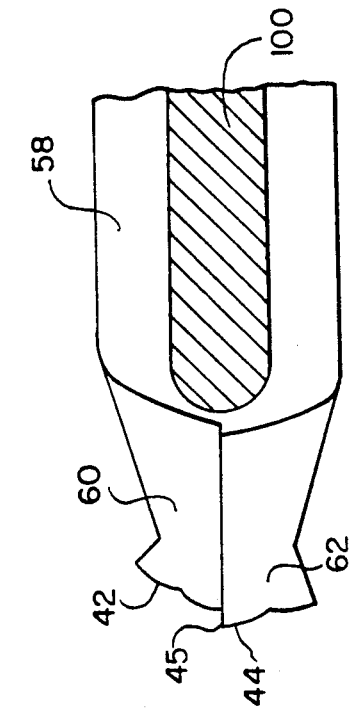

VARIABLE LENGTH LIMB-SPREADER

BACKGROUND OF THE INVENTION

1. Field of the Invention

Horticulture, particularly a variable length limb-spreader for use in positioning fruit tree limbs in the horticultural practice of "limb-spreading".

2. Description of the Prior Art

| ROARK et al. | 4,377,053 |
| McBRIDE | 4,649,665 |
| BREADNER | 4,918,860 |

ROARK is typical of complex telescoping devices for support or spreading of tree branches. BREADNER and McBRIDE are typical of fixed length branch spreaders, which require an inventory of different lengths so as to be practical.

The prior art does not suggest a molded plastic device which may be employed as a limb-spreader at 3", 6", 9", 12", 15", 18" and 21" intervals during the lifetime of the tree.

SUMMARY OF THE INVENTION

The positioning of fruit tree limbs from an upright, almost vertical attitude, to one more horizontal, is a cultural practice employed by most growers. The actual practice is most often referred to as "limb spreading" or simply, "spreading". It is a very old practice.

The benefits derived from spreading scaffold limbs are numerous. Suppression of too vigorous vegetative growth, increased flowering, improved light penetration and distribution, reduced fruit degradation resulting from limb rub, and precise radial spacing between limbs all are a direct, beneficial result of spreading.

The general development of a fruit tree shape, when left to grow without intervention is determined by the phenomenon of apical dominance. Meristematical tissues produce a growth regulator called auxins that restrict or inhibit shoot growth behind terminal buds. The more a shoot or limb is positioned in a vertical position, the greater the amount of auxin that is produced. Over time, these upright shoots will completely dominate a tree's structure, such that large amounts of barren wood will be forced behind the actively growing terminal. This natural phenomenon is a primary reason forest trees have long trunks without limbs.

When limbs are positioned in a more or less horizontal plane, auxin production is suppressed and shoots are permitted to grow along the entire length of the limb. This is of obvious benefit to fruit growers, as barren wood is unproductive.

Any cultural practice, intervention, or other means employed to restrict auxin production will result in greater fruit bearing surface and, thus, the potential for greater yields. Spreading is a horticultural practice achieving these benefits.

SPREADING AS A COMPONENT OF TREE SYSTEMS

Most modern tree training systems are fundamentally variations on a single design concept most often referred to as *The Central Leader System*. Basically, a Central Leader Tree is one trained such that a single, dominant stem is developed. Rising from this stem are lateral limbs or scaffold branches that are subordinate. Longer scaffold limbs are found within the tree's lower canopy and as one progresses up from its base, limbs are kept shorter and shorter. The final shape then, is conical, much as a Christmas tree is shaped.

The conical shape of a Central Leader Tree allows for maximum light penetration and distribution. Without adequate light, flower buds are not likely to form and those that do will produce fruit of small size, poor color, and inferior flesh quality.

Tree training begins with the first year of planting. The Central Leader (CL) is encouraged to grow vigorously this first year. Any shoots that compete with the CL are removed. However, weak shoots that are smaller than one-half the diameter of the CL are encouraged to grow also. In most cases, there will be too many of these desirable weak shoots. Thus, between three and five are selected as permanent scaffold limbs and the balance are removed with pruning shears. At the end of the first growing season, the tree should have a single, dominant shoot (the CL) and three to five subordinate scaffold limbs evenly spaced around the CL.

Because of apical dominance, even the selected scaffold branches will attempt to become the CL. Therefore, to avoid a multiple leader tree, the scaffold limbs are positioned with spreaders to force them to grow out, instead of up. This is usually done during the first dormant season. As these young, one year scaffolds are only twelve to eighteen inches in length, a very short spreader of between six and nine inches is all that is required to spread these one year limbs.

During the second growing season, the CL is headed to half its length in order to stimulate more weak shoots to grow and ultimately become a "second tier" of scaffold limbs. This second tier of laterals is separated vertically by a space of two to three feet. Further, they will not be allowed to grow longer than the first tier, or "first whirl", so as to maintain the conic shape.

During this second growing season, the first whirl or "first tier" of scaffold limbs will grow longer but without intervention, the first whirl will once again try to compete with the CL and beyond the space that was spread during the dormant season, will grow upright. At the same time, the second tier of limbs is selected and treated identically the way the first whirl was treated during the first growing season.

During the second dormant season, the first whirl of limbs must once again be spread to flatten the second year's upright growth. However, because these limbs are now much longer, a spreader of longer length must be used. The second tier is now spread similarly to the way the first was the previous dormant season. This "Head and Spread" system is repeated until the tree grows to the extent that it fills its allotted space within the tree row. Typically, it requires a minimum of three years, in the case of dwarf, high density plantings, to a maximum of eight years in the case of larger, standard trees, to complete the training process.

Therefore, with respect to spreader usage and tree training, a different and longer length of spreader is inserted in the tree every year until the space allotted each tree is filled. At that point, weight of fruit will keep the scaffold limbs at a more flattened position. Ironically, it is not unusual to actually prop up limbs after much time and effort has been expended spreading limbs down. This is because fruit load is greater than the limb's ability to carry it.

APPLICANT'S VARIABLE LENGTH SPREADER

Because it is common orchard practice to spread limbs and because there has been no economical product available to orchardists that would allow a single spreader to program the year-to-year task of tree training, applicant has designed the preset Variable Length Spreader (VLS). For the first time, orchardists may now make a single spreader purchase and be able to use that same spreader over the course of years required to train their trees.

Applicant's variable length spreader is a very simple concept of a single moulded plastic unit with outwardly extending struts that function as individual limb spreaders at differing lengths. Thus, may be provided a 6", 9", 12", 15", 18" and 22" spreader all in one unit.

The advantages of the variable length spreader are numerous. However, the single most important benefit to users is the fact that it will save money for growers. Instead of making individual and vast inventory purchases of fixed length spreaders, growers may now obtain the various spreader lengths required within a single spreader unit. The variable length spreader is priced such that for only a little more than the price of one fixed length 22" spreader, growers will obtain all the smaller lengths as a bonus.

Equally, if not more important than the savings of material manufacturing and inventory costs, is the fact that applicant's variable length spreader will save tremendous labor expense. Instead of growers paying workers to remove spreaders from the trees every year and replace the removed spreaders with longer spreaders, workers will simply reposition applicant's variable length spreader, such that the tree limbs engage the next appropriate strut. This capability will eliminate the need for sorting and warehousing unused spreaders of fixed length.

DESCRIPTION OF THE DRAWINGS

FIG. 1 is a side elevation of applicant's variable length limb spreader embodying pairs of diverging tree engaging arms extending outwardly at each end of an elongate shaft and a plurality of limb-engaging struts extending outwardly from the top and bottom of the shaft.

FIG. 2 is a bottom plan.

FIG. 3 is a transverse section, taken along section line 3—3 of FIG. 2.

FIG. 4 is an enlarged sectional view, taken along section line 4—4 of FIG. 1.

FIG. 5 is an enlarged sectional view, taken along section line 5—5 of FIG. 1.

DESCRIPTION OF THE PREFERRED EMBODIMENTS

Figure 8:
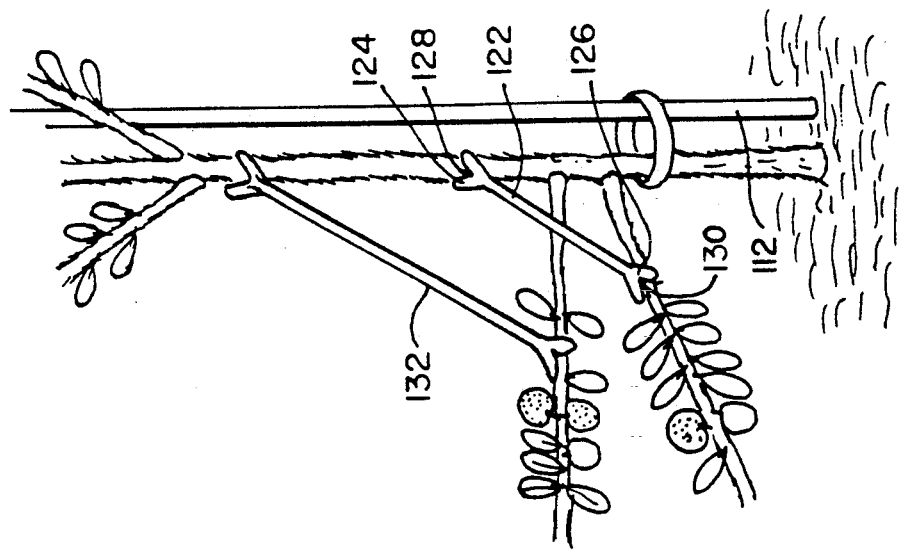
FIG. 8 is a front elevation showing use of conventional limb spreaders of fixed length.

In FIG. 1, applicant's variable length limb-spreader 10 is illustrated as comprised of an elongate shaft 12, embodying top vertical surface 14, bottom surface 16 and outwardly extending sides 34, 36.

Pairs of diverging tree-engaging arms 18, 20 extend outwardly at each end of the shaft. A plurality of limb-engaging struts 22, 24, 26 extend outwardly from top surface 12 and a plurality of outwardly extending struts 28, 30, 32 extend outwardly from the bottom surface 16 of shaft 12.

Identical tree-engaging spikes 38, 40 extend outwardly from each end of the shaft, so as to substantially bisect the angles formed by the diverging pairs of arms 18, 20.

As illustrated in FIG. 1, a plurality of angularly extending spikes 46, 50, 54 extend from the top 14 of shaft 12. These spikes may include barbed tips 48, 52, 56.

Similarly, spikes 58, 64, 68, embodying respectively, sharpened tips 60, 66, 70 extend from the shaft bottom surface 16 so as to intersect the angles between the struts 28, 30, 32 and bottom surface 16.

Figure 7:
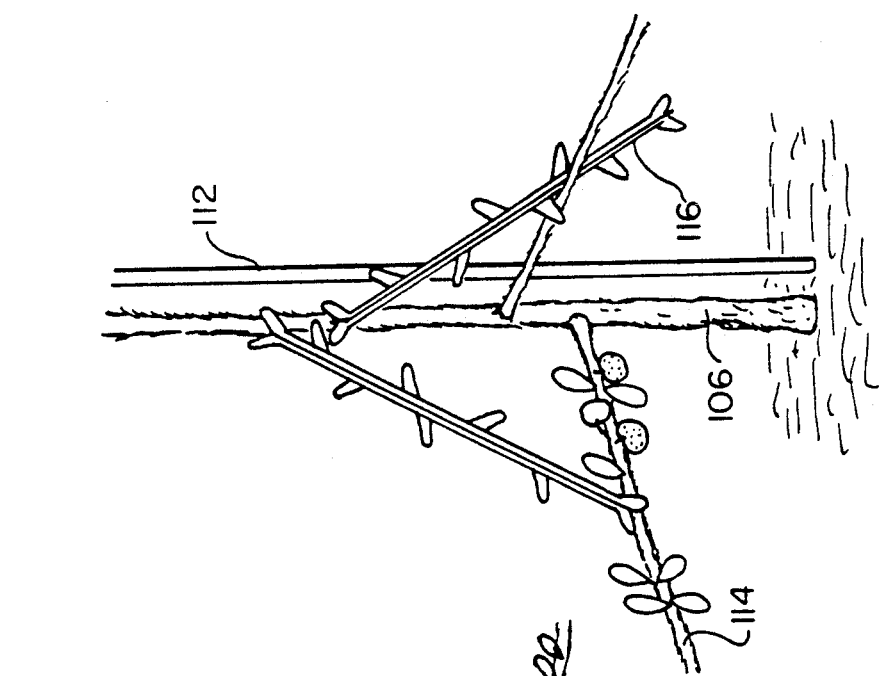
FIG. 7 is a front elevation showing a plurality of variable length limb-spreaders positioned with a fruit tree.

The pairs of diverging arms 18, 20 are formed from identically molded surfaces 80, 82 having a flattened exterior, tips 84, 86 and flattened bearing surfaces or pads 88, 90. As illustrated in FIG. 7, divergent pairs of arms 18, 20 are positioned against the central leader 106 of the tree, such that the spikes 38, 40 penetrate the central leader and the surfaces or pads 88, 90 abut the sides of the central leader.

As will be apparent, the limb-engaging struts 22, 24, 26, 28, 30 and 32 may extend at variant angles with respect to strut 12, and, also, the number of struts may be increased or diminished, as desired.

In FIG. 1, strut 22 is shown as formed from base-like fin 92 with flattened rear surface 94, extending to rounded shoulder 96, with inner surface 98 having pad or bearing surface 100. The inner flattened portion 102 of the strut extends to spike 46, having sharpened tip 48. A bearing surface or pad 104 is positioned on the adjacent top surface of shaft 16.

Figure 6:
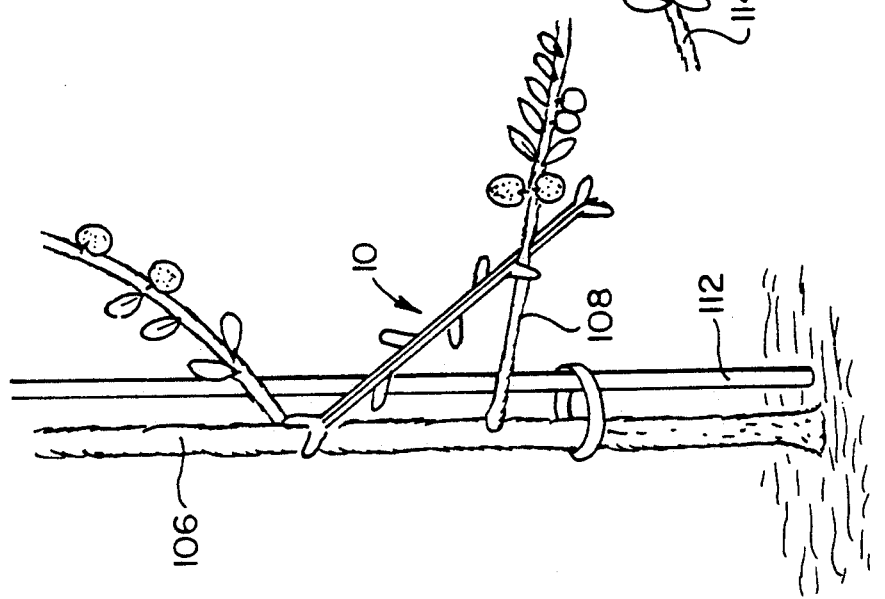
FIG. 6 is a front elevation, showing positioning of applicant's variable length limb-spreader between the central leader and a spreading branch (first whirl) of an apple tree.

As illustrated in FIGS. 6 and 7, the individual struts and their identical bearing surfaces or pads 100, 104 engage the limbs by means of the spikes 46 having sharpened tip 48, which pierces the limb being spread.

As illustrated in FIG. 5, individual spikes 46 may have upper surface 60 and lower surface 62, which extend to sharpened edges 42, 44 for engaging the individual limbs. As illustrated in FIG. 5, sharpened edge 44 may be lengthened, so as to form a barb which will penetrate the surface of the limb being spread.

In FIGS. 6 and 7, the central leader stem 106 is represented as supported by pipe or stake 112 such that the individual limbs 114, 116, 118, 120 may be spread by a plurality of variable length limb spreaders 10.

In FIG. 8, conventional plastic fixed length spreaders 122, 132, are shown as embodying identical pairs of diverging arms 124, 126 with axially extending spikes 120, 128 extending between the pairs of arms. As the tree grows and it is desired to displace the limbs at different angles, different spreaders of different fixed lengths are required to be employed. Manifestly, the horticulturist is required to maintain a vast inventory of fixed length spreaders, even though only a portion of the inventory is in use at any given time. The advantages of employing a single variable length spreader which is not required to be removed from the tree or inventoried during its lifetime of growth are manifest.

Variations in the construction of the elongate shaft, the pairs of diverging arms and the outwardly extending struts may be employed without departing from the spirit and scope of the invention, as defined in the claims.

We claim:

1. A variable length limb spreader for trees having a central leader and outwardly extending branches comprising:
   a. an elongate shaft having opposed ends, top, bottom and side surfaces and further including:
      i) a pair of diverging tree-engaging arms extending outwardly at each end of said shaft, and
      ii) a plurality of limb-engaging struts extending outwardly from the top and bottom of said shaft so as to form a bearing surface for engaging the outwardly extending branches of the tree.

2. A variable length limb spreader for trees having a central stem and outwardly extending branches as in claim 1, wherein each said pair of diverging tree-engaging arms is aligned in a vertical plane with the top and bottom of said shaft.

3. A variable length limb spreader for trees having a central leader and outwardly extending branches as in claim 1, further including:
   iii. a plurality of angularly extending spikes, extending outwardly between said struts and the adjacent top and bottom surfaces of said shaft, so as to engage the outwardly extending branches.

4. A variable length limb spreader for trees having a central leader and outwardly extending branches as in claim 3, further including:
   iv. a central leader-engaging spike extending outwardly of each end of said shaft intermediate said pair of diverging tree engaging arms.

5. A variable length limb spreader for trees having a central leader and outwardly extending branches as in claim 3, said angularly extending spikes essentially bisecting the angle between said top and bottom surfaces of said shaft and said outwardly extending struts.

6. A variable length limb spreader for trees having a central leader and outwardly extending branches as in claim 5, including a bearing pad defined on the inside end of each said strut and a bearing pad defined on the adjacent top and bottom surfaces of said shaft.

7. A variable length limb spreader for trees having a central leader and outwardly extending branches as in claim 6, including a pair of bearing pads defined on the inside ends of said diverging arms.

8. A variable length limb spreader for trees having a central leader and outwardly extending branches as in claim 7, wherein said limb-engaging struts and said pairs of diverging arms are aligned in a vertical plane.

9. A variable length limb spreader for trees having a central leader and outwardly extending branches as in claim 8, said limb-engaging struts being disposed at variant angles with respect to the top and bottom surface of said shaft.

* * * * *